May 28, 1968 W. J. JONES 3,385,286

HYDROGEN-OXYGEN CATALYTIC HEATER

Filed Jan. 25, 1967 2 Sheets-Sheet 1

WITNESSES
Wm. B. Sellers
Lee P. Johns

INVENTOR
William J. Jones
BY
Frederick Shoop
ATTORNEY

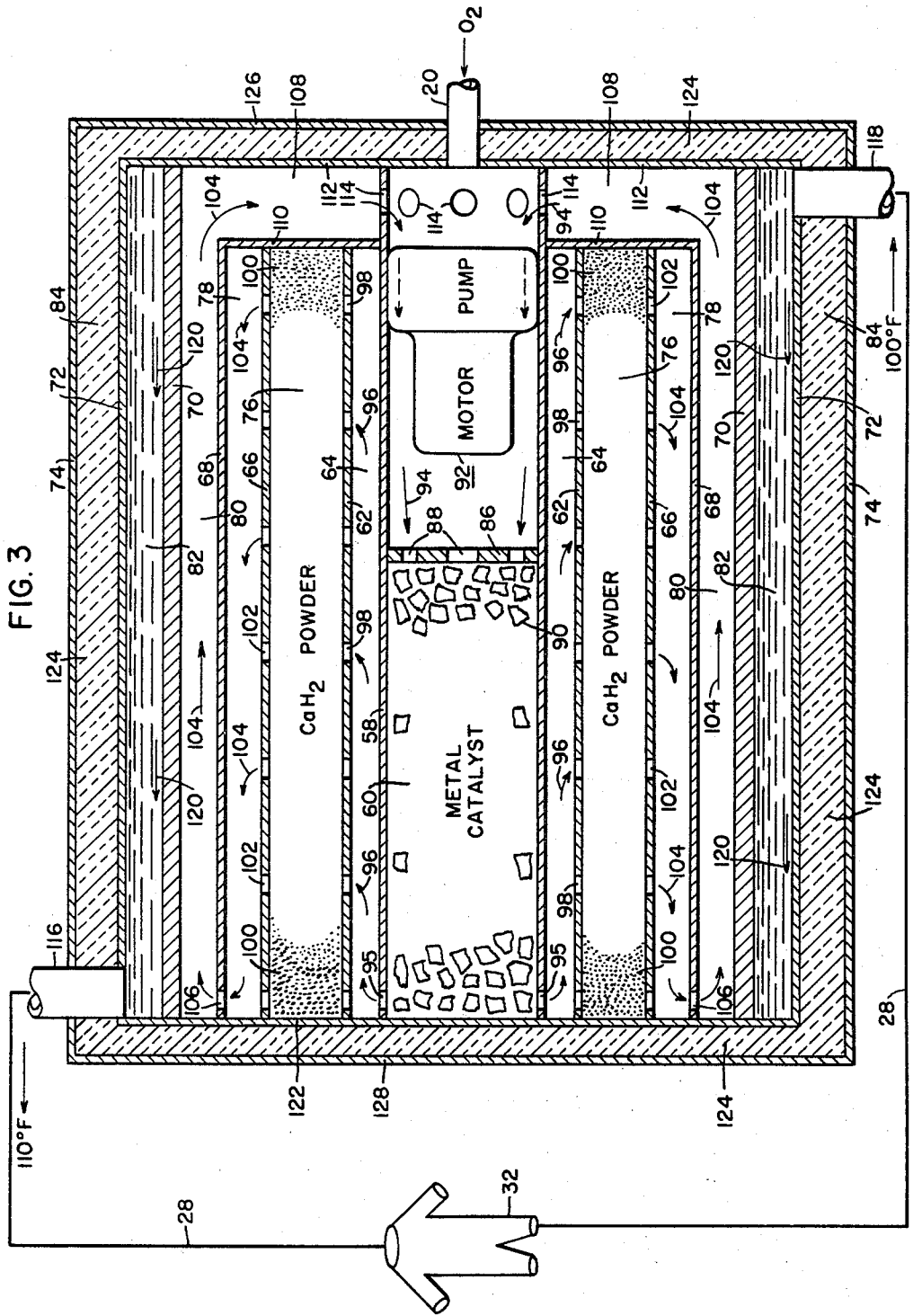

United States Patent Office 3,385,286
Patented May 28, 1968

3,385,286
HYDROGEN-OXYGEN CATALYTIC HEATER
William J. Jones, Pittsburgh, Pa., assignor to Westinghouse Electric Corporation, Pittsburgh, Pa., a corporation of Pennsylvania
Filed Jan. 25, 1967, Ser. No. 611,767
11 Claims. (Cl. 126—204)

ABSTRACT OF THE DISCLOSURE

The invention is directed to a thermochemical heat generator comprising a hydrogen-oxygen catalytic heater with means for generating hydrogen from water vapor, for maintaining the body comfort over extended time periods of persons involved in excessively cold conditions such as underwater diving or outer space travelers.

---

Persons involved in such activities as underwater swimming and outer space travel are presently limited in mission capability principally by the lack of an adequate thermal protection system. Although underwater swimmers have adequate breathing equipment for up to six hours, present thermal protective garments limit the mission duration of a swimmer to only one hour in water at about 40° F. An electrically heated garment using storage batteries and resistance wires has been only mildly successful because of functional and manufacturing problems, and the inherent bulk of the energy source.

Another type of energy source currently under development generates heat by the decay of radioisotopes, which have an inherently high energy density. Disadvantages, however, include very high cost due to the limited availability of isotopes, as well as the necessity of dissipating the continuous heat output during shelf-life or when the device is not in use.

Thermochemical energy sources offer a factor of 10 increase in energy density over electrochemical (battery) systems, and a corresponding increase in mission duration without some of the drawbacks of the radioisotope systems. However, a practical thermochemical system has not heretofor been developed.

Disadvantages associated with some thermochemical systems are the generation of harmful, toxic, or otherwise potentially dangerous by-products such as the generation of hydrogen or carbon monoxide.

It has been found in accordance with this invention that the foregoing problems and disadvantages may be overcome by the employment of a heat generation unit involving thermochemical reactions as a heat source. The system is basically a hydrogen-oxygen catalytic burner using a solid chemical hydrogen source and a pressurized gaseous oxygen supply. The proposed thermochemical reactions for such a heat source are:

$$2H_2 + O_2 \rightarrow 2H_2O + \text{heat}$$
$$CaH_2 + 2H_2O \rightarrow Ca(OH)_2 + 2H_2 + \text{heat}$$

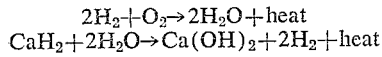

The combustion of hydrogen and oxygen is accomplished at low concentrations and temperatures upon a catalyst such as platinum or palladium to form water as an intermediate reaction product. The reaction of calcium hydride ($CaH_2$) with the by-product water vapor reconverts the water generated in the first reaction back to hydrogen which is then available for reconversion to hydrogen in a never-ending cycle. It is noted that the water generated by the combustion of hydrogen is substantially equal to that required in the hydrogen generation reaction. As a result, the net reaction of the foregoing formulas is:

$$CaH_2 + O_2 \rightarrow Ca(OH)_2 + \text{heat}$$

Re-use of the product water eliminates a number of problems in the system design and considerably reduces its complexity. Advantages include (1) recirculation of unused hydrogen or oxygen permits stoichiometric utilization of the reactants without stoichiometric proportioning of flows with the accompanying high temperatures and explosion hazards; (2) substantially no gaseous reaction by-products are produced which must be vented, thereby minimizing detection problems and safety hazards; and (3) no provision must be made to add water or hydrogen from an external source to the reactor, thereby reducing system design and operational complexity.

Accordingly, it is a general object of this invention to provide a hydrogen-oxygen catalytic heater for a thermal protective covering having the benefits of a semi-closed system.

It is another object of this invention to provide a hydrogen-oxygen catalytic heater for a thermal protective garment which extends the mission capability of persons working in abnormally cold environments by providing a portable energy source of auxiliary heat for his thermal protection.

It is another object of this invention to provide a hydrogen-oxygen reactor for a thermal protective garment which utilizes chemical reactions for producing thermal energy in a recycling system.

It is another object of this invention to provide a hydrogen-oxygen reactor for a thermal protective garment which utilizes chemical reactions for producing thermal energy in the form of a practical and reliable heat source for extended periods of time.

It is another object of this invention to provide a hydrogen-oxygen reactor for thermal protective garments using a chemical system that minimizes weight, bulk, safety and handling hazards, and detection problems.

Finally, it is an object of this invention to satisfy the foregoing objects and desiderata in a simple and expedient manner.

Basically, the present invention involves a portable device for providing controlled quantities of heat, comprising a conduit for introducing a stream of oxygen into a recirculating stream containing a limited concentration of hydrogen in a diluent gas; means for catalytically reacting the hydrogen with the oxygen to generate water vapor and liberate heat, the proportions of hydrogen and oxygen being below the flammability limits for such gases; other means by which the resulting mixture of water vapor, residual reactants, and diluent gas is directed to a fixed bed of chemical reagent where the water vapor reacts to produce hydrogen and liberate heat, the amount of hydrogen being produced being substantially equal to that consumed in the previous reaction; further means for directing the heated gases to a point of application or exchange of heat; and means for pumping or moving the recirculating gases against the flow restrictions in the closed loop and conveying the relatively cool hydrogen and diluent gas mixture leaving the heat exchanger back to the point of introduction of oxygen, and repeating the foregoing process.

For a better understanding of the invention, reference is made to the drawings in which:

FIG. 3 is a sectional view of a reaction vessel using the forced circulating system.

Similar numerals refer to similar parts throughout the several views of the drawings.

Figure 1:
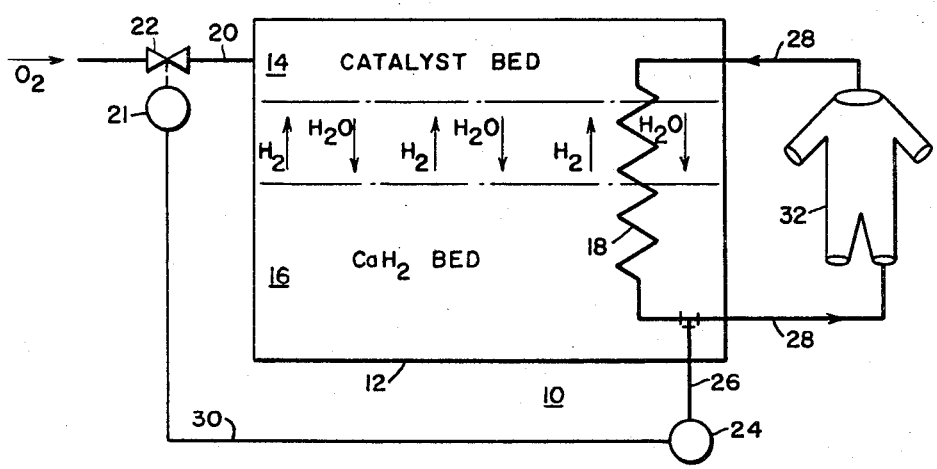
FIGURE 1 is a schematic view of a diffusion-controlled system for a hydrogen-oxygen heater for a protective garment.

In FIG. 1 a schematic system is generally indicated at 10 for control of an oxygen-hydrogen heater by diffusion. The system can include a container 12 which includes a hydrogen-oxygen catalytic reactor portion 14 and a solid-chemical hydrogen generator portion 16 as well as a heat exchanger coil 18. An oxygen inlet line 20 having an oxygen control valve 22 extends into the container 12 from one side thereof. Manual or automatic valve control means for increasing or decreasing the amount of oxygen admitted through the line 20 may be provided and is preferably dependent upon the temperature of the heat transfer fluid leaving the reactor. For that purpose, a temperature measuring device such as a thermostat 24 is connected by a line 26 to a conduit 28 containing a heat exchange fluid, which conduit is connected to the heat exchanger coil 18. In addition, the valve control means includes a solenoid 21 controlled by a wire 30 leading from the thermostat 24 to the oxygen control valve 22 for opening and closing the valve.

As shown in FIG. 1, the line 28 containing the heat transfer fluid leads to a garment 32 composed preferably of flexible material such as a woven or knitted fabric or a film which provides support for series and parallel arrangement of conduits over the body. The conduits are composed of a flexible tubular material, and are attached to or woven into the flexible material, so as to distribute heat appropriately over the body of the person wearing the garment 32.

The heat within the conduit 28 is derived from the heat exchange coil 18 which extends around or through the reactor. The portion 14 is preferably composed of a metal catalyst material such as platinum or palladium over and through which mixtures of hydrogen and oxygen move by diffusion. When the mixture of oxygen and hydrogen gases contacts the catalyst material, the gases react to form water and yield heat which is ultimately absorbed by the coil 18. The amount of water formed is in a one-to-one mole ratio with the $H_2$ consumed.

The water developed in the portion 14 diffuses to the portion 16 which is composed of a material that reacts with water to form hydrogen. Such a material may be and is preferably composed of a metal hydride such as lithium hydride, magnesium hydride, calcium hydride, or mixtures thereof. Such hydrides react with water on an equal mole ratio basis; that is, they yield one mole of hydrogen for each mole of water consumed, thus recreating the hydrogen consumed in the previous reaction. In a closed system such as involved herein, it is necessary to maintain a hydrogen inventory to minimize design complexity and operational safety hazards. Accordingly, if a reagent is used that yields more hydrogen than water consumed the concentration of hydrogen will gradually increase, producing a rise in pressure and creating a potentially dangerous $H_2$ concentrate.

Conversely, use of a reagent that reacts to produce less than one mole of $H_2$ for each mole of water would result in a gradual decrease in $H_2$ concentration, thus requiring water or $H_2$ addition to maintain the reaction rate and heat output, and considerably increasing the complexity of the system. The hydrogen generated in the portion 16 diffuses back to the portion 14 where it reacts with more oxygen in the presence of the catalyst to again form water, the cycle being repeated indefinitely.

As a result of the above reactions, oxygen is consumed and ultimately appears by the formation of a metal hydroxide from the metal hydride. For that reason, controlled amounts of oxygen are introduced into the system via the inlet line 20 and the valve 22. The amount of oxygen introduced may be controlled manually in response to a subjective feeling of comfort, or automatically by the thermostat 24 which is responsive to the temperature in the line 28.

In the system shown in FIG. 1 in which the generator portions 14 and 16 are incorporated in one compartment, the water vapor and the hydrogen gas move from one reaction site to the other by diffusion. The portions 14 and 16 need not be physically separated as shown, but may be integrated into a substantially homogeneous mixture to minimize the distances over which diffusion transport must occur, and maximize the reaction rates.

Although the system of FIG. 1 is preferred because of its simplicity, acceptable rates of gas transfer of hydrogen and water between the portions 14 and 16 are not entirely satisfactory because of their dependence upon diffusion, thereby limiting the heat output rate of the generator. This disadvantage can be overcome by use of forced circulation as illustrated by the system in FIG. 2.

Figure 2:
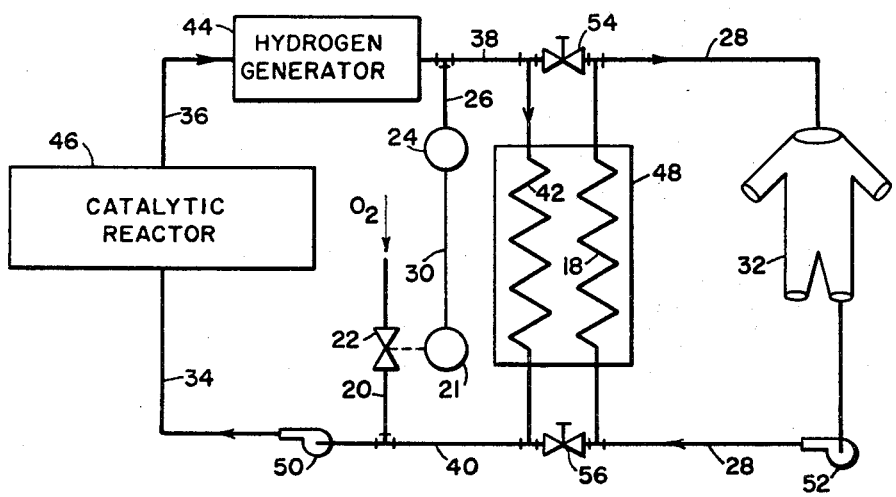
FIG. 2 is a schematic view of a forced circulation system for such a heater.

The device of FIG. 2 includes a continuous loop or closed conduit including conduit sections 34, 36, 38, and 40 as well as a heat exchange coil 42. The conduit sections extend between and communicate with separate reaction zones including a hydrogen generator 44 and a hydrogen-oxygen catalytic reactor 46. Parts having similar numerals in FIGS. 1 and 2 have corresponding construction and function.

The reaction rates and heat output of this system may be similarly controlled in response to the source temperature by the oxygen flow control valve and a high limit restriction as shown schematically in FIG. 2. The coil 42 transfers heat to the coil 18 within a heat exchanger housing 48 and within which a heat transfer fluid is flowing. A gas pump 50 is disposed in the conduit such as between the conduit sections 40 and 34.

The system shown in FIG. 2 operates in a manner similar to that of FIG. 1 except that forced circulation is employed. The hydrogen-oxygen reactor 46 is a chamber containing a catalyst such as platinum or palladium. As a gaseous mixture of hydrogen and inert gas to which a controlled amount of oxygen has been added is passed through the reactor 46 stoichiometric proportions of hydrogen, which is always in excess, combine with substantially all the oxygen to form water in a one-to-one mole ratio with the hydrogen consumed and yielding heat. Due to the action of the pump 50, the gaseous mixture containing the by-product water vapor passes through the conduit section 36 to the solid chemical hydrogen generator 44 where the water reacts with a metal hydride such as calcium hydride to produce a mole volume of hydrogen gas equal to that of the water consumed in the reaction. Calcium hydride is converted to calcium hydroxide in an exothermic reaction. Thus, the mixture of gases leaving the generator 44 is at an elevated temperature as it enters the heat exchanger coil 42 where it transfers its heat to the coil 18 through which a heat exchange fluid such as water is circulated by a pump 52. The heated water upon leaving the heat exchanger 48 is transported to the garment 32 which is identical in construction to the garment shown in FIG. 1.

In the alternative, where precise controls may be exercised upon the heat generated in the generators 44 and 46, the heat exchange coils 18 and 42 may be omitted by the use of similar sections 54 and 56 so that the gaseous mixture (instead of water) is circulated directly through the garment 32 to heat the garment.

In order to control the rate of oxygen introduction and heat output of the system, a thermostat control 24 can be used to measure the temperature of the gas mixture in the conduit section 38 with which it is connected by the line 26 and actuates the solenoid valve 22 to increase or decrease the amount of oxygen introduced into the circuit through the inlet line 20. A fixed high limit restriction would limit flow to a reasonable level in the case of control failure. Alternately, a manual control with a high limit flow restriction may be used in response to a subjective feeling of comfort.

The sequence of the positions of the components 42, 44, 46, and 50 may be rearranged to any alternate position without detriment to the operation of the system. The arrangement shown is preferred because it places the pump directly after the heat exchanger, thereby minimizing the gas temperature at this point, and eliminates the presence of high concentration of water vapor in the low temperature portion of the loop, thereby minimizing the possibility of H₂O condensation in these portions of the loop resulting in the loss of $H_2$-$H_2O$ circulating inventory.

During operation of the system, the calcium hydride is gradually depleted due to the formation of calcium hydroxide. Eventually, the calcium hydroxide must be replaced by a fresh supply of calcium hydride.

An operable device employing the principles of the schematic layout of FIG. 2 is shown in FIG. 3. It involves a plurality of radially disposed chambers or compartments separated by concentrically mounted cylinders. A central cylinder 58 encloses an axial chamber 60. A cylinder 62 of greater diameter than the cylinder 58 encloses an annular chamber 64 around the cylinder 58. Likewise, a series of radially larger cylinders 66, 68, 70, 72, and 74 enclose annular chambers 76, 78, 80, 82, and 84, respectively. The chambers 60, 64, 76, 78, 80, 82, and 84 provide for reactions or the flow of reactants involved or hold the catalyst, reactants, and provide for proper channeling of the gas and coolant fluids.

As shown in FIG. 3, the chamber 60, is divided into two longitudinal portions by a partition 86 having perforations or apertures 88. The left end portion of the chamber 60 is filled with a catalyst material 90 such as platinum or palladium, or pieces typically deposited on an inert substrate such as an aluminum oxide pellet or dispersed within an inert matrix. The right end portion of the compartment 60 contains a motor and pump unit 92 for moving the gas mixture around the recirculation loop in the direction shown by the arrows 94, 96, and 104. After passing through the apertures 88 in the partition 86 and into contact with the catalyst material 90, the gaseous mixture containing oxygen and hydrogen reacts exothermically in the presence of the catalyst 90 to form water vapor. This heated gas mixture, which now contains water vapor, nitrogen, and any residual reactants leaves the chamber 60 through a plurality of spaced apertures 95 at the left end portion of the cylinder 58.

The gaseous mixture flows axially in the annular chamber 64 in the direction indicated by the arrows 96 and is distributed through a series of axially and angularly spaced apertures 98 in the cylinder 62. The gas mixture then flows radially through the chamber 76 which is filled with a granulated metal hydride 100 such as calcium hydride ($CaH_2$) with which the water vapor reacts in an exothermic reaction to again form hydrogen. The metal hydride is converted to a metal hydroxide. The further heated mixture of gases including principally hydrogen in an inert gas then leaves the chamber 76 via a series of spaced apertures 102 in the cylinder 66 as shown by the arrows 104. The gas mixture then is collected in the annular chamber 78 and directed by means of the apertures 106 in the cylinder 68 to preferably another annular chamber 80 where the sensible heat in the gas mixture is transferred to the water-cooled cylinder 70. Finally, the cooled gas is collected in an end chamber 108 between longitudinally spaced plates or walls 110 and 112 from where it passes through apertures 114 and is mixed with a controlled oxygen flow from tube 20 in the right end of the original chamber 60.

Once the system has become operative, the gas mixture leaves the chamber 60 containing the granulated metal catalyst members 90 at a temperature ranging up to 700° F. depending upon the oxygen concentration introduced and limited by the hydrogen concentration in the closed loop. In the chamber 76 containing the metal hydride where the water in the gas mixture is reconverted to hydrogen, the gas mixture is further heated and leaves the chamber 76 at a temperature as high as 1150° F., depending upon the concentration of water vapor formed in the preceding reaction. At the latter temperature, the gas is brought into heat exchange contact with the cylinder 70, the outer surface of which forms one wall of a water jacket having a water outlet 116 and an inlet 118, and is cooled to approximately 150° F. maximum. The water flow is preferably counter to the flow of gas with which it is exchanging heat, as indicated by the arrows 120 in the annular chamber 82, the right end of which is closed by the plate 112 and the left end of which is closed by the plate 122. The water enters inlet 118 of the chamber 82 at a temperature of approximately 100° F. and leaves the chamber through the outlet 116 at a temperature of about 110° F.

The entire assembly may be enclosed within an insulation layer 124 which is disposed within the chamber 84 between the cylinders 72 and 74. In addition, insulation 124 may be disposed at opposite ends of the assembly between the end wall 108 and a wall 126 as well as between the plate 122 and a wall 128. An integrated unit such as that shown in FIG. 3 may be mounted as a part of the back pack of an underwater diver and utilize a controlled high pressure gaseous oxygen supply separately or in conjunction with the oxygen supply tank for the diver's breathing equipment.

As shown in FIG. 3, the right end of the axial chamber 60 communicates with the oxygen inlet line 20 at the center of the wall 112. Thus, as oxygen is consumed by the conversion of calcium hydride to calcium hydroxide the supply of oxygen is maintained at the desired level to control the reaction rate and heat output of the reactor. During this conversion process, the calcium hydride undergoes a volume increase of appriximately 50%. This results in a reduction in the free space gas volume in the reactor, and the excess gas inventory is vented through the pressure relief valve, (not shown) to maintain a constant gauge pressure in the reactor.

Periodically, the metal hydroxide canister is replaced with a fresh supply of metal hydride as needed.

An example of the initial preparation and operation of a system such as that shown in FIG. 3 may be as follows:

EXAMPLE

The catalyst chamber 60 is charged with approximately 6 cubic inches of aluminum oxide pellets coated with palladium. The canister chamber 76 is charged with 1.3 pounds of calcium hydride, inserted into the reactor, and the end plate installed. The pressure vessel is then charged with a gas mixture of 4% hydrogen and 96% nitrogen up to a pressure between about one-half to full operating pressure. The recirculation pump is started, and oxygen is then introduced into the system at the design flow rate to bring it up to operating temperature. The consequent expansion of the gas raises the preessure to the full operating level (typically 15–25 atmospheres) and excess gas is vented through the pressure relief valve to maintain system operating pressure.

During operation of the system over a six hour period 350 thermal watts or 2100 watt hours are produced. The calcium hydride is substantially converted to calcium hydroxide having a 45% greater volume than the initial calcium hydride charge. To accommodate this volume expansion and maintain a homogeneous distribution within the canister bed, a compressible inert bulk material such as asbestos can be initially intermixed with the granular calcium hydride. A total of ⅔ pound of oxygen (about 8.5 standard cubic feet) is consumed in order to maintain the necessary oxygen supply. The operating pressure is maintained at a constant level in spite of the volume expansion in the calcium hydride bed by venting of the excess recirculating gas mixture.

The temperature of operation of the system is directly dependent upon the concentration of oxygen introduced and limited by the percentage of hydrogen. A maximum $O_2$ concentration of 1.5% would normally be maintained, resulting in a maximum total temperature rise in the catalytic and calcium hydride reaction of 1000° F., reaching a maximum temperature before heat exchange of 1150° F. and a minimum gas temperature after heat exchange of 150° F. The recirculated fluid carrying the heat to the diver's garment 32 is increased typically from 100° F. to 110° F.

The portable energy source or system of the present invention when used in conjunction with an effective insulating and heat distribution garment, provides adequate auxiliary heat for the thermal protection of an underwater swimmer at a moderate activity level for 6 hours in 40° F. water. Heat distribution is preferably via a stretchable undergarment which is interwoven or attached to a series and parallel arrangement of flexible tubular conduits of relatively small cross-section whereby the heat exchange fluid transmits heat to the swimmer's body or in the case of a "wet" suit insulating garment, to the fluid directly adjacent to his body.

This portable system is advantageous because it operates on a closed cycle, with no appreciable amounts of exhaust by-products which might prove to be a safety hazard, or in the case of a secretive mission, produce a possible detection problem due to appreciable gas evolution. This is accomplished by the use of a metal hydride reagent that produces hydrogen gas from water vapor in exact mole proportions to compensate for the hydrogen consumed in catalytic combustion. Thus the original charge of hydrogen is reused indefinitely, and the net reaction by-product is solid calcium hydroxide.

Various modifications may be made within the spirit of the invention.

What is claimed is:

1. A device for providing controlled quantities of heat comprising conduit means for recirculating a gaseous mixture containing oxygen, a water vapor reactor and a hydrogen reactor in the conduit means, the water vapor reactor containing a catalyst for reacting oxygen and hydrogen to creating an intermediate by-product of water vapor, the hydrogen reactor containing a metal hydride for reacting with water vapor to restore the hydrogen to the gaseous mixture, heat exchanger means in the conduit means for removing the heat generated by the reactions from the gaseous mixture, and means in the conduit means for introducing oxygen into the gaseous mixture.

2. The device of claim 1 in which the hydrogen-oxygen mixture is maintained within non-flammable limits.

3. The device of claim 1 in which the gaseous mixture is circulated by forced circulation.

4. The device of claim 1 in which the reaction rate is controlled by regulating the oxygen flow rate into the mixture.

5. The device of claim 2 in which the volume of oxygen exceeds that of hydrogen and is present in a substantially constant concentration.

6. The device of claim 3 in which the reaction rate is controlled by the rate of recirculation in the conduit means.

7. The device of claim 3 in which the hydrogen is present in limited excess, and the recirculation rate is controlled by the oxygen flow rate.

8. The device of claim 1 in which the hydrogen generator is a replaceable canister of metal hydride.

9. The device of claim 1 in which the maximum concentration of hydrogen in inert gas mixture is 4%.

10. A device for providing controlled quantities of heat comprising a conduit for supplying a stream of oxygen to a chemical reactor, means for mixing the oxygen with a closed inventory of hydrogen and for reacting it to create an intermediate by-product of water, means for further reacting the water with a chemical reagent to recover the original hydrogen inventory, and means for removing and utilizing the heat generated by these exothermic reactions.

11. The device of claim 10 in which the gaseous mixture is transferred in a closed reaction by diffusion.

References Cited

UNITED STATES PATENTS

| 2,938,356 | 5/1960 | McMahon | 62—3 |
| 2,966,684 | 1/1961 | Bonin | 2—81 |
| 3,075,361 | 1/1963 | Lindberg | 165—1 X |
| 3,085,405 | 4/1963 | Frantti | 62—3 |
| 3,161,192 | 12/1964 | McCormack | 126—204 |
| 3,182,653 | 5/1965 | Mavleos et al. | 126—204 |

FREDERICK L. MATTESON, JR., *Primary Examiner.*

E. G. FAVORS, *Assistant Examiner.*